United States Patent
Yoshida et al.

(10) Patent No.: US 12,246,936 B2
(45) Date of Patent: Mar. 11, 2025

(54) WEB-WOUND ROLLS WITH MICROSPHERE TREATED EDGE AND METHODS OF MAKING SAME

(71) Applicant: 3M INNOVATIVE PROPERTIES COMPANY, St. Paul, MN (US)

(72) Inventors: Yuko Yoshida, Tokyo (JP); Yorinobu Takamatsu, Sagamihara (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 266 days.

(21) Appl. No.: 15/539,335

(22) PCT Filed: Dec. 16, 2015

(86) PCT No.: PCT/US2015/066089
§ 371 (c)(1),
(2) Date: Jun. 23, 2017

(87) PCT Pub. No.: WO2016/109205
PCT Pub. Date: Jul. 7, 2016

(65) Prior Publication Data
US 2017/0369264 A1     Dec. 28, 2017

Related U.S. Application Data

(60) Provisional application No. 62/097,729, filed on Dec. 30, 2014.

(51) Int. Cl.
*B65H 18/28* (2006.01)
*B29C 31/10* (2006.01)
(Continued)

(52) U.S. Cl.
CPC .............. *B65H 18/28* (2013.01); *B29C 31/10* (2013.01); *B32B 37/1292* (2013.01);
(Continued)

(58) Field of Classification Search
None
See application file for complete search history.

(56) References Cited

U.S. PATENT DOCUMENTS 4,942,000 A  7/1990  Penoyer
5,393,589 A  2/1995  Zeller
(Continued)

FOREIGN PATENT DOCUMENTS

CA  969435 A1 *  6/1975
CN  102119199 A  7/2011
(Continued)

OTHER PUBLICATIONS

International Search Report for PCT International Application No. PCT/US2015/066089, mailed on Mar. 28, 2016, 4 pages.

*Primary Examiner* — Alicia Chevalier
(74) *Attorney, Agent, or Firm* — Thomas M. Spielbauer

(57) ABSTRACT

Web-wound rolls with a web edge treatment with microspheres and processes to make the same are provided. The web-wound rolls include a substrate web having at least two web edges. One or more stripes of coated material are disposed adjacent to one or both of the web edges. The substrate web is wound upon itself in multiple revolutions about a central core, and each revolution is held substantially separate from the next by the one or more stripes of coated material.

13 Claims, 2 Drawing Sheets

(51) Int. Cl.
 *B32B 37/12* (2006.01)
 *B32B 37/20* (2006.01)
 *B32B 37/24* (2006.01)
 *B32B 38/00* (2006.01)
 *B65H 37/04* (2006.01)

(52) U.S. Cl.
 CPC ............ *B32B 37/20* (2013.01); *B32B 37/24* (2013.01); *B32B 38/164* (2013.01); *B65H 37/04* (2013.01); *B32B 37/12* (2013.01); *B32B 2037/243* (2013.01); *B65H 2301/414324* (2013.01); *B65H 2601/272* (2013.01); *B65H 2701/132* (2013.01); *B65H 2701/1752* (2013.01)

(56) References Cited

U.S. PATENT DOCUMENTS

| | | |
|---|---|---|
| 5,677,050 A | 10/1997 | Bilkadi |
| 7,238,401 B1 | 7/2007 | Dietz |
| 2007/0089832 A1 | 4/2007 | Kitchin |
| 2008/0204643 A1* | 8/2008 | Sasada ................ B32B 23/20 428/220 |
| 2008/0277522 A1 | 11/2008 | Delmore |
| 2009/0246478 A1 | 10/2009 | Graham |
| 2009/0294029 A1 | 12/2009 | Gotz |
| 2010/0291352 A1 | 11/2010 | Jager |
| 2011/0151169 A1 | 6/2011 | Maier |
| 2012/0148791 A1 | 6/2012 | Yamanaka |
| 2015/0353777 A1 | 12/2015 | Callinan et al. |

FOREIGN PATENT DOCUMENTS

| | | |
|---|---|---|
| JP | S59-048511 U | 3/1984 |
| JP | 2000-108228 A | 4/2000 |
| JP | 2004-506066 A | 2/2004 |
| JP | 2007-186594 A | 7/2007 |
| JP | 2009-086426 A | 4/2009 |
| JP | 2010-058311 | 3/2010 |
| JP | 2012-247737 | 12/2012 |
| JP | 2013-046966 | 3/2013 |
| JP | 5172208 | 3/2013 |
| JP | 5692069 | 4/2015 |
| WO | WO 1994-019420 | 9/1994 |
| WO | WO 2011-030684 | 3/2011 |

* cited by examiner

WEB-WOUND ROLLS WITH MICROSPHERE TREATED EDGE AND METHODS OF MAKING SAME

CROSS REFERENCE TO RELATED APPLICATIONS

This application is a national stage filing under 35 U.S.C. 371 of PCT/US2015/066089, filed Dec. 16, 2015, which claims the benefit of U.S. Application No. 62/097,729, filed Dec. 30, 2014, the disclosure of which is incorporated by reference in its/their entirety herein.

TECHNICAL FIELD

The present disclosure relates to web-wound rolls having a web edge treatment with microspheres, and processes to make the same.

BACKGROUND

Winding impression defects are very common in a web-wound roll process for winding or rolling continuous films or webs. An inside pressure distribution of a web-wound roll can be made by, for example, surface roughness of the roll core, wrinkles, foreign matters, etc., which can generate impression defects and/or film deformation. Various approaches have been described in, for example, PCT Publication No. WO 2011030684 (Maeda), and Japanese Patent Application Publication Nos. JP 201346966 and JP 2012247727 to reduce the winding impression defects.

SUMMARY

There is a desire to reduce winding impression defects in web-wound roll processes. While soft winding can be effective to reduce winding impression defects, soft winding may generate telescoping issues. The present disclosure provides soft winding processes for forming web-wound rolls that does not generate telescoping issues. The term "soft winding process" used herein refers to a web-wound roll process with a winding tension not greater than 1 N/cm, typically between 0.01 N/cm and 1 N/cm.

Briefly, in one aspect, the present disclosure describes a web-wound roll that includes a web including a substrate having a first major side and a second major side opposite to the first major side, and at least two web edges. One or more stripes of coated material have a thickness and are disposed on one or both of the first and second major sides adjacent to one or both of the web edges. The substrate is rolled upon itself in multiple revolutions about a central core, and each revolution is held substantially separate from the next by the one or more stripes of coated material. In some embodiments, the web is a multi-layer optically clear laminate that includes a release liner, and the one or more stripes of coated material are disposed on a surface of the release liner along one or more of the web edges.

In another aspect, a method of winding a web includes providing a web comprising a substrate web having a first major side and a second major side opposite to the first major side, and at least two web edges, disposing one or more stripes of coated material having a thickness on one or both of the first and second major sides adjacent to one or both of the web edges, and winding the substrate web upon itself in multiple revolutions about a central core. Each revolution is held substantially separate from the next by the one or more stripes of coated material.

Various unexpected results and advantages may be obtained in exemplary embodiments of the disclosure. One such advantage of exemplary embodiments of the present disclosure is that continuous films or webs can be wound by a soft winding process without generating any telescoping issues. In contrast, conventional approaches such as, for example, taper reducing tension, knurling of roll edge, insertion of spacer, or the combinations thereof, may not achieve the advantages of the present disclosure. For example, while a process using taper reducing wind tension control may be effective to reduce the winding impression, the effect of such process is limited by factors of web handling which depends on the web properties and equipment capability. While knurling on both web edges may provide the space between adjacent layers of wounded film and may reduce the inner pressure thereof, it is difficult to obtain stable knurling process with thin films or webs since it is easy to create critical damages on web edges. While insertion of spacer at both web edges may reduce the inner wound pressure, it would be difficult to control the position, thickness, and/or flexibility of spacer to achieve the effects.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
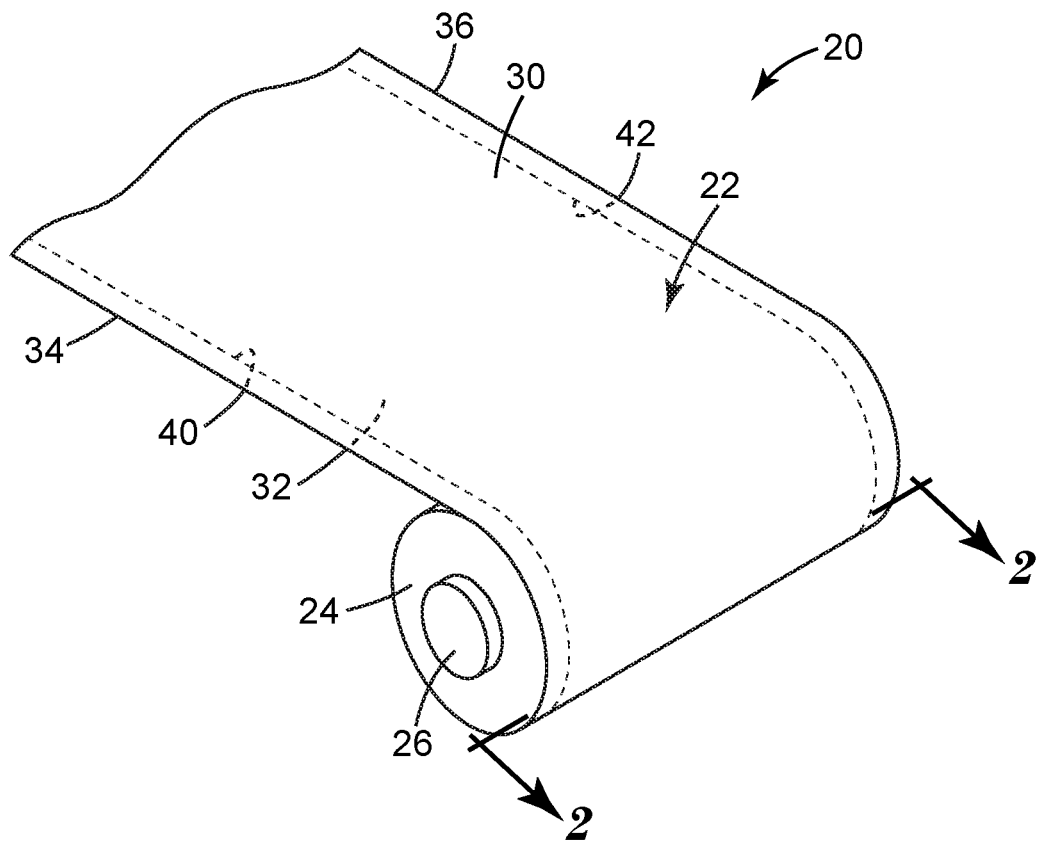
FIG. 1 is a perspective side view of a web-wound roll, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides web-wound rolls having a web edge treatment with microspheres (e.g., a microsphere adhesive), and processes to make the same. Some films or webs described herein can be wound by soft winding processes that are effective to reduce winding impression defect without generating telescoping issues.

FIG. 1 illustrates a perspective view of a web-wound roll 20. The web-wound roll 20 includes a continuous web 22 of indefinite length material. The continuous web 22 is wound upon itself by a soft winding process in multiple revolutions 24, conveniently around a central core 26. In some embodiments, the soft winding process uses a winding tension not less than 0.01 N/cm, not less than 0.05 N/cm, or not less than 0.1 N/cm. In some embodiments, the soft winding process uses a winding tension not greater than 1 N/cm, not greater than 0.5 N/cm, or not greater than 0.2 N/cm. In some embodiments, the soft winding process uses a winding tension between 0.01 N/cm and 1 N/cm, between 0.05 N/cm and 1 N/cm, or between 0.1 N/cm and 0.5 N/cm. The continuous web 22 has a first major side 30 and a second major side 32 opposite to the first major side 30, and two web edges 34 and 36 substantially parallel with each other. The continuous web 22 has a width W1 defined between the web edges 34 and 36. In some embodiments, the width W1 can vary from several centimeters to several meters dependent on desired applications.

In some embodiments, the continuous web 22 can include one or more layers of flexible (co)polymeric material. In some embodiments, the continuous web 22 can be a multi-layer optically clear laminate suited for attachment to, for example, window glass. One exemplary multi-layer optically clear laminate is described in U.S. Pat. No. 7,238,401 (Dietz) which is incorporated herein by reference.

Two stripes of coated material 40 and 42 are disposed on the second major side 32. The stripes 40 and 42 are disposed adjacent to the web edges 34 and 36, respectively. The stripes 40 and 42 each are continuous and extend along the respective web edges 34 and 36 with a width W2. In some embodiments, the ratio of W2/W1 can be, for example, not less than 0.01, not less than 0.02, or not less than 0.05. In some embodiments, the ratio of W2/W1 can be, for example, not greater than 0.3, not greater than 0.2, or not greater than 0.1. In some embodiments, the ratio of W2/W1 can be, for example, between 0.01 and 0.2, between 0.02 and 0.2, or between 0.05 and 0.2. In some embodiments, the stripe 40 or 42 can be disposed immediately adjacent to the respective web edge 34 or 36. In other embodiments, the stripe 40 or 42 can be spaced apart from the respective web edge 34 or 36 with a distance of, for example, not greater than the width W2. It is to be understood that the stripe 40 or 42 may not have a uniform width W2 along the respective web edge 34 or 36. In some embodiments, the coated material 40 and 42 each can include multiple stripes of coated material extending along the respective web edges 34 and 36. The thickness of the stripes of coated material can be, for example, not less than 0.1 microns, not less than 0.5 microns, or not less than 1 micron. The thickness of the stripes of coated material can be, for example, not greater than 200 microns, not greater than 100 microns, or not greater than 50 microns. In some embodiments, the thickness of the stripes of coated material can be, for example, from 0.5 microns to 100 microns.

In some embodiments, one or more stripes of coated material such as the stripes 40 and 42 can be disposed on one or both of the first and second major sides 30 and 32, adjacent to the web edge 34 or 36. In one embodiment, the stripes 40 and 42 can be disposed on the first major side 30. In anther embodiment, the stripe 40 can be disposed on the first major side 30 adjacent to the web edge 34 and the stripe 42 can be disposed on the second major side 32 adjacent to the web edge 36. In yet another embodiment, one or more stripes of coated material can be disposed only adjacent to one of the web edges 34 and 36.

The coated material such as contained in the stripes 40 and 42 preferably includes microspheres, which may be adhesive microspheres comprising an adhesive and the microspheres. In some embodiments, the adhesive may be a single adhesive or an adhesive blend which may include on or more adhesive components, e.g., microsphere and adhesive, and the term "adhesive blend" may be interchangeably used with "microsphere adhesive" or MSA.

In some embodiments, the adhesive blend can have from 1 to 50 parts by weight, preferably from 3 to 12 parts by weight of microspheres, and have from 50 to 99 parts by weight, preferably from 75 to 97 parts by weight of adhesive, based on the total weight of the adhesive and the microspheres. Other components can be used, including but not limited to, modifiers, such as rheology modifiers, colorants, fillers and other (co)polymeric additives. If such modifiers are used, the amounts used in the adhesive mixture are amounts effective for the known uses of such modifiers. One exemplary adhesive blend composition is described in U.S. Patent Application Publication No. 20090246478 (Graham et al.), which is incorporated herein by reference.

In some embodiments, at least a portion of the microspheres of the adhesive blend can be solid, elastomeric, deformable, and non-tacky microspheres. The non-tacky microspheres can be particularly suited as a detackifying agent. Thus, once blended with an adhesive composition such as a pressure sensitive adhesive (PSA) composition, the non-tacky microspheres of the present disclosure provide a useful tool to allow one to control the adhesion of the aggregate adhesive.

In some embodiments, the microspheres can be solid and are non-crushable. The microspheres can also be substantially not swellable upon exposure to various solvents. The microspheres can have a highly crosslinked nature, and thus can be solvent insoluble. The microspheres can also be deformable, thereby allowing the substrate (e.g., the continuous web 20) coated with the adhesive blend to be wound up on itself without creating a hard band on a roll.

In some embodiments, the microspheres can have an average diameter of, for example, from one micron to 200 microns. The microspheres can have an average diameter greater than the thickness of the adhesive coated on the substrate.

In some embodiments, the microspheres of the adhesive blend can be prepared by a suspension polymerization process by polymerizing at least one alkyl(meth)acrylate monomer having from 1 to 14 carbon atoms, at least one multifunctional crosslinker, at least one initiator, and at least one polymeric stabilizer. Other optional components can be used in the reaction mixture, including but not limited to, surfactants.

In some embodiments, the adhesive of the adhesive blend can include any pressure sensitive adhesive (PSA) composition that satisfies a rheological criterion for tack, for example, the Dahlquist criterion. The pressure sensitive adhesive can be solvent based, water based, or a hot melt, so long as the microspheres are compatible and stable therein. In one embodiment, the pressure sensitive adhesive is a repositionable adhesive. A suitable pressure sensitive adhesive for use in the adhesive blend of the present disclosure is described in PCT Publication WO 1994/019420. The publication describes a repositionable pressure sensitive adhesive composition comprising a blend of one or more polymeric, inherently tacky, elastomeric microspheres and an adhesive binder comprising at least one acrylamide-based moiety. It is to be understood that the adhesive blend can include any suitable adhesives other than the pressure sensitive adhesive.

Figure 2:
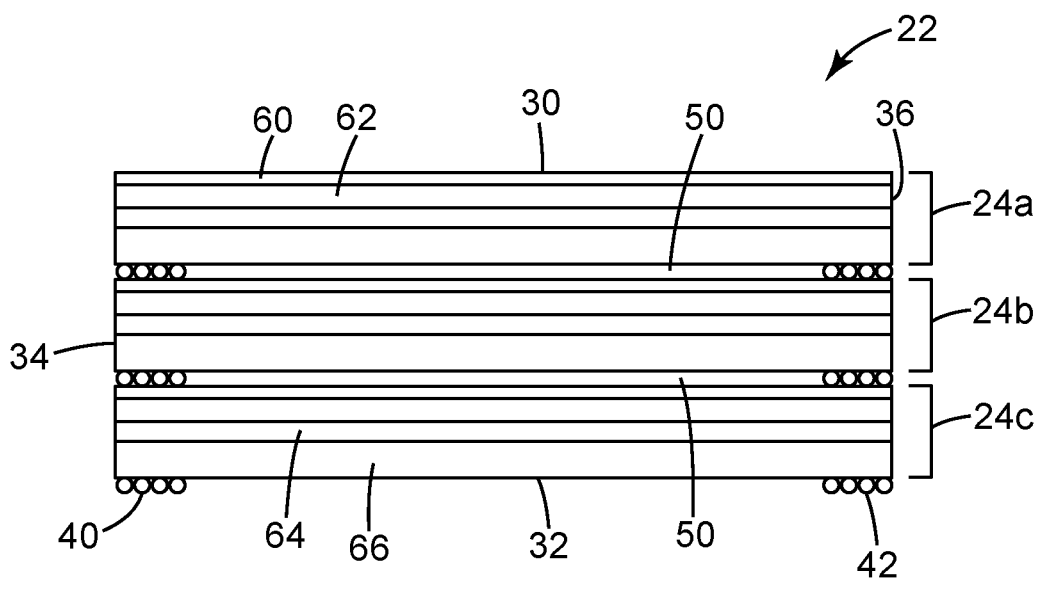
FIG. 2 is a cross sectional view of a portion of the web-wound roll of FIG. 1.

Referring now to FIG. 2, a cross section view of several of the wound revolutions 24, taken along section lines 2-2 in FIG. 1, is depicted. In this view it can be appreciated that each of revolutions 24a, 24b and 24c of the continuous web 22 is held substantially separate from the next by the stripes 40 and 42 of coated material. Spaces 50 can be created between adjacent revolutions 24a, 24b and 24c. It is to be understood that in some embodiments, one or more stripes of coated material can be provided between the stripes 40 and 42, for example, inside the spaces 50 to keep the adjacent revolutions separate.

As shown in FIG. 2, the stripes 40 and 42 are coated on the second side 32 adjacent to the respective web edges 34 and 36. The stripes 40 and 42 each include the microspheres and the adhesive where the adhesive covers a portion of the microspheres so that some of the microsphere protrude above or extend from a front surface of the coated adhesive. The average diameter of the microspheres is greater than the coating thickness of the adhesive thereby allowing a portion of the microsphere to protrude beyond an exposed surface of the adhesive. The protruded portion of the microspheres contacts the first side 30 of the adjacent revolution and the friction therebetween can prevent relative axial movement between adjacent revolutions, and thus prevent possible telescoping issues.

The continuous web 22 of FIGS. 1 and 2 can be an optical film where any scratches or defects such as winding impression defects and/or film deformation may be plainly visible therein with the naked eye when viewed under, for example, fluorescent lights at a distance of about 0.5 m. In the embodiment of FIG. 2, the continuous web 22 is a laminate that includes a hard coat 60 adhered to a (co)polymeric film 62 which is laminated to a release liner 66 by an optically clear adhesive (OCA) 64.

In some embodiments, the hard coat 60 may be obtained by applying any commercially available hard coating composition to the surface of the (co)polymeric film 62, as the case may be, provided that the resultant hard coat layer dries to form a scratch-resistant surface. The hard coating composition can be, for example, a ceramer coating composition containing an organic resin and silica particles as described in U.S. Pat. No. 5,677,050 (Bilkadi et al.). In some embodiments, the hard coating composition may include about 20% to about 80 wt % of ethylenically unsaturated monomers, about 10 wt % to about 50 wt % of acrylate functionalized colloidal silica, and about 5 wt % to about 40 wt % of N,N-disubstituted acrylamide monomer or N-substituted-N-vinyl-amide monomer. The coating can then be cured to provide an abrasion-resistant, light transmissive ceramer coating on the top film lamina of the laminate. The hard coating is preferably applied to the film before it is used to form the laminate.

In some embodiments, the (co)polymeric film 62 may include any suitable polymeric material. The polymeric material can be nonadhesive and may be formed into a sheet which is of substantially uniform thickness along its entire area and is optically clear with substantially no surface imperfections which might interfere with optically clarity. The term "nonadhesive" means that the polymeric material used to form the film is not an adhesive type material such as conventionally used to make glass or layered film laminates. Such adhesive polymeric materials would include thermoplastic adhesive materials such as polyvinyl butyral, ethylene terpolymers, epoxies, polyurethanes, silicones and acrylic polymers. In one embodiment, the polymeric film 62 is a polyethylene terephthalate (PET) film. The (co)polymeric film 62 may vary in thickness not less than 0.5 mil (0.013 mm), not less than 1 mil (0.025 mm), or not less than 1.5 mils (0.038 mm). The (co)polymeric film 62 may vary in thickness not greater than 20 mils (0.508 mm), not greater than 10 mils (0.254 mm), or not greater than 5 mils (0.127 mm). The (co)polymeric film 62 may vary in thickness from about 0.5 mil to about 10 mils (0.013 to 0.25 mm), but preferably do not exceed about 5 mils (0.13 mm) in thickness. The (co)polymeric film 62 may be made of polymeric material such as polyethylene-terephthalate (PET) which when formed into a sheet, biaxially oriented and heat set provides a high breaking strength film with excellent optical properties. In some embodiments, the polymeric films can be primed or corona treated to improve adhesion between coatings and adhesive layers.

In some embodiments, the optically clear adhesive (OCA) 64 between the (co)polymeric film 62 and the release liner 66 may include any relatively soft pressure sensitive adhesive material that can be optically clear, for example, having a transmittance not less than 50% in the visible wavelength range. The pressure sensitive adhesive material may, itself, not be optically clear in a free standing condition but once incorporated into the laminate can have an optically clear condition and sufficient adhesion to maintain the layers of the laminate in an unaltered form over any of a wide variety of climatic conditions. The pressure sensitive adhesive compositions can be based on acrylate or acrylic copolymers and terpolymers. The thickness of the optically clear adhesive (OCA) 64 may vary, for example, from about 0.1 mil to about 1 mil (0.003 to 0.025 mm).

In some embodiments, the release liner 66 may include any conventional sheet material. The release liner 66 provides protection for the exposed surface of the optically clear adhesive (OCA) 64. The release liner 66 may have temporary weak adhesion to the surface of optically clear adhesive (OCA) 64 to which it is applied, and thus can strip cleanly from the surface to leave behind an undamaged layer of adhesive for attachment to the surface of, for example, a glass sheet.

Referring again to FIG. 2, the stripes 40 and 42 are coated along the respective web edges 34 and 36 on the surface of the release liner 66 of one revolution and in contact with the hard coat 60 of the adjacent revolution. Some stripes described herein can use an adhesive blend that contains solid, elastomeric, non-tacky microspheres with a pressure sensitive adhesive. The adhesive blend is capable of adhering to the surface of the release liner 66 to form the stripes 40 and 42. In some embodiments, when the optical film is under use, for example, for attachment to window glass, the release liner 66 can be removed and the stripes 40 and 42 of coated material can be removed along with the release liner 66. In some embodiments, the web edges 34 and 36 along with the stripes 40 and 42 of coated material can be trimmed before the use of the optical film.

Figure 3:
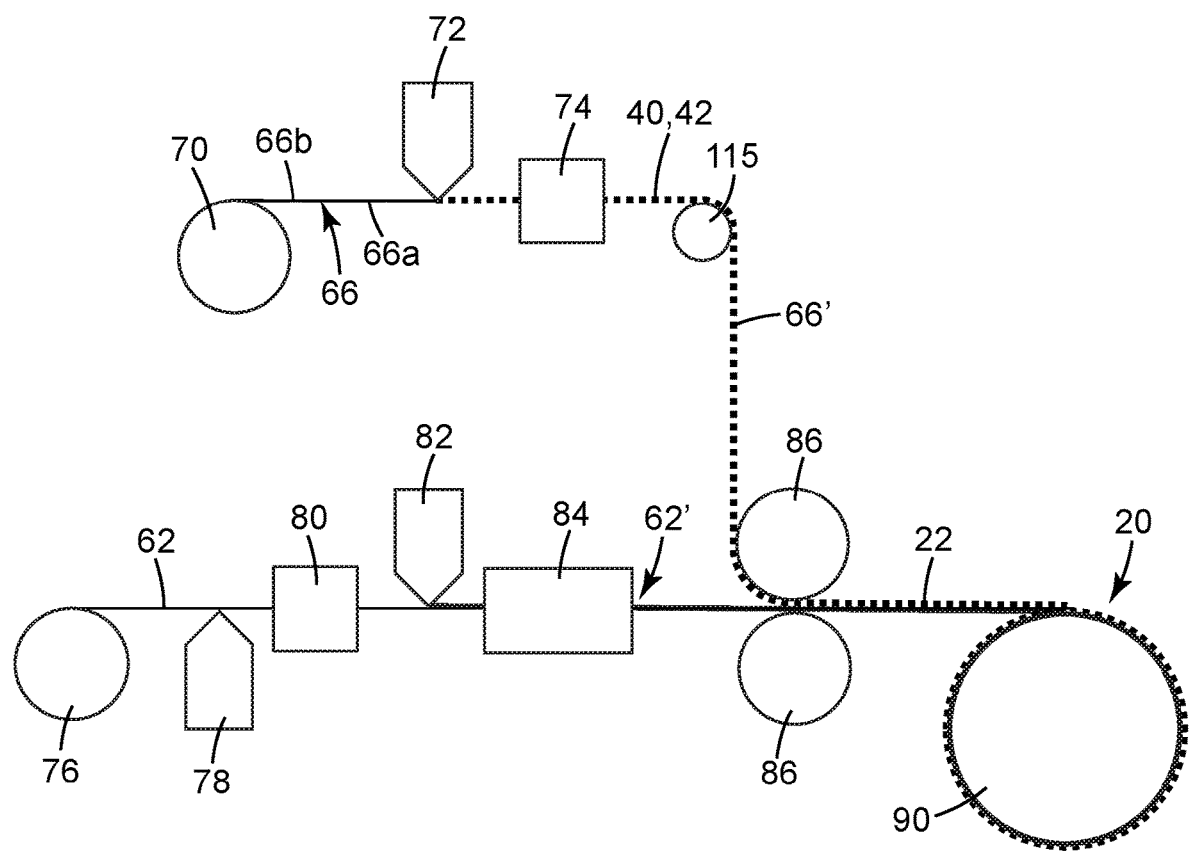
FIG. 3 is a schematic view of a process for forming a web-wound roll, according to one embodiment.

Referring now to FIG. 3, a schematic view of one possible process for forming a web-wound roll such as the web-wound roll 20 of FIG. 2, according to the present disclosure is depicted. The release liner 66 is unwound from a unwind stand 70. In the depicted embodiment, the release liner 66 has a first side 66a that may have been treated to possess release properties, and a second side 66b which preferably is left untreated. The stripes of coated material 40 and 42, conveniently in the form of a microsphere adhesive (MSA), are dispensed onto the second side 66b, conveniently by a coater 72 such as, for example, a gravure coater. When the coated material 40 and 42 is provided as a convenient MSA in water or solvent suspension onto the surface of release liner 66, the release liner 66 is passed through a thermal oven 74 to dry the coated material 40, 42 to form edge-coated release liner 66'. One or more idle rolls such as roll 115 can be used to direct the release liner 66.

In the embodiment of FIG. 3, the (co)polymeric film 62 is unwound from an unwind stand 76. The (co)polymeric film 62 such as that available under the trade designation MELINEX 454-200 film is obtained from a commercial source. The (co)polymeric film 62 receives a coating of hard coat material from a coater 78 to provide a wet coating of hard material which is dried by passing through a drier 80 to form the hard coat 60 of FIG. 2. The coater 78 can be any convenient coating device such as one including a slot die to provide a uniform coating to the surface of the (co)polymeric film 62. The drier 80 can be any convenient drying or curing device such as, for example, a tunnel oven or a curing station using a UV source. The coating solution can be any commercially available hard coating solution which has appropriate viscosity to make it coatable. Then, the optically clear adhesive 64 is coated by another coater 82 on the opposite side of the (co)polymeric film 62 and dried by a drier 84. The coating solution can be any convenient solution of a pressure sensitive adhesive. The twice coated substrate 62' and the once coated release liner 66' are brought together as at laminating station 86 and laminated together. The laminated material, together defining web 22, is conveyed to a winding stand 90, where the continuous web 22 is wound to form the web-wound roll 20.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that:

The term "continuous" used herein refers to the length of a substrate web up to, for example, tens, hundreds, or even thousands of meters.

The terms "(co)polymer" or "(co)polymers" used herein refer to homopolymers and copolymers, as well as homopolymers or copolymers that may be formed in a miscible blend, e.g., by coextrusion or by reaction, including, e.g., transesterification.

The term "non-tacky" generally means that the microspheres have a tack value of less than about 5 grams, preferably less than about 3 grams, and more preferably less than about 1 gram, as measured using a texture tack analyzer.

The term "elastomeric" used herein can be described as applying to amorphous or non-crystalline materials that can be stretched to at least twice their original length (or diameter) and which will retract rapidly and forcibly to substantially their original dimensions upon release of the force.

As used herein, the term "repositionable" refers to the ability to be repeatedly adhered to and removed from a substrate without substantial loss of adhesion capability.

The term "release liner" used herein refers to a paper or plastic-based film sheet used to prevent a sticky surface from prematurely adhering, where it is coated on one or both sides with a release agent to provide a release effect against a sticky material such as an adhesive.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent or optical clear refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Listing of Exemplary Embodiments

Exemplary embodiments are listed below. It is to be understood that any one of embodiments A to M and N to X can be combined.

Embodiment A is an article comprising:

a web comprising a substrate having a first major side and a second major side opposite to the first major side, and at least two web edges;

one or more stripes of coated material having a thickness and disposed on one or both of the first and second major sides adjacent to one or both of the web edges, wherein the substrate is rolled upon itself in multiple revolutions about a central core, and wherein each revolution is held substantially separate from the next by the one or more stripes of coated material.

Embodiment B is the article of embodiment A, wherein the thickness of the one or more stripes of coated material is from 0.5 microns to 100 microns.

Embodiment C is the article of embodiment A or B, wherein the coated material comprises microspheres.

Embodiment D is the article of any one of the preceding embodiments, wherein the coated material further comprise an adhesive.

Embodiment E is the article of embodiment D, wherein the adhesive comprises an adhesive blend.

Embodiment F is the article of embodiment E, wherein the adhesive blend comprises from about 1 to 50 parts by weight of microspheres and from about 50 to 99 parts by weight of an adhesive.

Embodiment G is the article of embodiment C, wherein the microspheres include solid, elastomeric, deformable, and non-tacky microspheres.

Embodiment H is the article of embodiment F or G, wherein the microspheres have an average diameter greater than a coating thickness of the adhesive on the substrate.

Embodiment I is the article of any one of embodiments F to H, wherein the adhesive comprises a pressure sensitive adhesive (PSA).

Embodiment J is the article of embodiment I, wherein the pressure sensitive adhesive is a repositionable adhesive.

Embodiment K is the article of any one of the preceding embodiments, wherein the one or more stripes of coated material each have a width W1, the continuous web has a width W2, and the ratio of W1/W2 is between 0.01 to 0.2.

Embodiment L is the article of any one of the preceding embodiments, wherein the substrate includes a flexible polymeric film.

Embodiment M is the article of any one of the preceding embodiments, wherein the continuous web is a multi-layer optically clear laminate that includes a release liner, and the one or more stripes of coated material are disposed on a surface of the release liner along one or more of the web edges.

Embodiment N is a method comprising:
providing a continuous web comprising a substrate web having a first major side and a second major side opposite to the first major side, and at least two web edges;

disposing one or more stripes of coated material having a thickness on one or both of the first and second major sides adjacent to one or both of the web edges; and winding the substrate web upon itself in multiple revolutions about a central core, wherein each revolution is held substantially separate from the next by the one or more stripes of coated material.

Embodiment O is the method of embodiment N, wherein the substrate web is wound in a roll-to-roll process with a winding tension not greater than 1 N/cm.

Embodiment P is the method of embodiment O, wherein the winding tension is between 0.1 N/cm and 0.5 N/cm.

Embodiment Q is the method of any one of embodiments N to P, wherein the coated material comprises microspheres.

Embodiment R is the method of any one of embodiments N to Q, wherein the coated material further comprise an adhesive.

Embodiment S is the method of embodiment R, wherein the adhesive comprises an adhesive blend.

Embodiment T is the method of embodiment S, wherein the adhesive blend comprises from about 1 to 50 parts by weight of microspheres and from about 50 to 99 parts by weight of an adhesive.

Embodiment U is the method of any one of embodiments Q to T, wherein the microspheres include solid, elastomeric, deformable, and non-tacky microspheres.

Embodiment V is the method of embodiment U, wherein the microspheres have an average diameter greater than a coating thickness of the adhesive on the substrate.

Embodiment W is the method of embodiment R, wherein the adhesive comprises a pressure sensitive adhesive (PSA).

Embodiment X is the method of embodiment W, wherein the pressure sensitive adhesive is a repositionable adhesive.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

Microsphere Adhesive (MSA)

Microspheres containing a copolymer of 96 wt % of 2-Ethylhexylacrylate, 6 wt % of Acrylic acid, and 0.05 wt % of 1,4-Butanediol-diacrylate were prepared by suspension polymerization. The microspheres have an average particle diameter as measured by an optical microscopy, of about 30 microns and are suspended in a mixed solvent of 50 wt % of 2-propanol, 30 wt % of water, and 20 wt % of dioxolane to form the microsphere adhesive (MSA) which has a solid concentration of 1.5 wt %.

Example 1

In Example 1, a continuous web having 400 mm width was coated with the microsphere adhesive with a coating width of 25 mm along both web edges. The coating amount was about 55 cc/m$^2$ in wet, or about 60 microspheres were coated per mm$^2$ surface area. The continuous web was formed by the process of FIG. 3 with 2.5 microns thick hard coating, 15 microns thick PSA, 25 micron thick PET, and 38 microns thick release liner. Winding tension was set at 10N/400 mm to wind the continuous web into a wound-web roll.

Example 2

In Example 2, a continuous web is a 400 mm wide PET film with a release liner of silicone which has very low friction. The microsphere adhesive was coated with a coating width of 25 mm along both web edges. The coating amount was about 55 cc/m$^2$ in wet, or about 60 microspheres were coated per mm$^2$ surface area. Winding tension was set at 5N/400 mm to wind the film into a wound-web roll.

Example 3

In Example 3, a continuous web is a 200 mm wide PET film having a thickness of 10 microns. The microsphere adhesive was coated with a coating width of 25 mm along both web edges. The coating amount was about 55 cc/m² in wet, or about 60 microspheres were coated per mm² surface area. Winding tension was set at 2N/200 mm to wind the PET film into a wound-web roll.

Comparative Example A

In Comparative Example A, a continuous web was the same as in Example 1, but without the microsphere adhesive coated along the web edges thereof.

The winding impression defect was compared between Examples 1, 2 and 3, and Comparative Example A after unwinding a portion of each wound-web roll. Images for the examples were taken by using MAKYOH YIS-SP system from Yamashita Denso Corporation (Tokyo, Japan). The MAKYOH YIS-SP system utilizes the principle of magic mirror where when parallel beams of light are applied to a fine unevenness surface, the reflected light scatters at the convex part, which gives darker image, and condenses at the concave part, which gives brighter image. Winding impression defects were observed in the image of Comparative Example A, but not observed in the images for Examples 1, 2 and 3.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An article comprising:
   a continuous web comprising a flexible polymeric substrate having a first major side and a second major side opposite to the first major side, and first and second web edges opposite to each other;
   one or more stripes of coated material having a thickness and disposed on one or both of the first and second major sides adjacent to the respective first and second web edges,
   wherein the continuous web is rolled upon itself in multiple revolutions about a central core to form a web-wound roll, and
   wherein each revolution of the web-wound roll is held substantially separate from the next at the respective web edges by the one or more stripes of coated material which comprises an adhesive blend including an adhesive and microspheres to provide a friction at the respective web edges and prevent a relative axial movement between adjacent revolutions, and the microspheres have an average diameter greater than a coating thickness of the adhesive such that at least some of the microspheres protrude beyond an exposed surface of the adhesive to contact the adjacent revolution.

2. The article of claim 1, wherein the thickness of the one or more stripes of coated material is from 0.5 microns to 100 microns.

3. The article of claim 1, wherein the adhesive blend comprises from about 1 to 50 parts by weight of microspheres and from about 50 to 99 parts by weight of an adhesive.

4. The article of claim 1, wherein the microspheres include solid, elastomeric, deformable, and non-tacky microspheres.

5. The article of claim 1, wherein the adhesive comprises a pressure sensitive adhesive (PSA).

6. The article of claim 5, wherein the pressure sensitive adhesive is a repositionable adhesive.

7. The article of claim 1, wherein the one or more stripes of coated material each have a width W1, the continuous web has a width W2, and the ratio of W1/W2 is between 0.01 to 0.2.

8. The article of claim 1, wherein the continuous web is a multi-layer optically clear laminate that includes a release liner, and the one or more stripes of coated material are disposed on a surface of the release liner along one or more of the web edges.

9. The article of claim 1, wherein a portion of the microspheres protrudes beyond an exposed surface of the adhesive to contact the respective web edges of the adjacent revolution.

10. The article of claim 1, wherein the web-wound roll is a softly-wound roll with a winding tension between 0.1 N/cm and 0.5 N/cm.

11. A method comprising:
    providing a continuous web comprising a flexible polymeric substrate having a first major side and a second major side opposite to the first major side, and first and second web edges opposite to each other;
    disposing one or more stripes of coated material having a thickness on one or both of the first and second major sides adjacent to the respective first and second web edges; and
    winding the continuous web upon itself in multiple revolutions about a central core to form a web-wound roll with a winding tension not greater than about 1 N/cm,
    wherein each revolution of the web-wound roll is held substantially separate from the next at the respective web edges by the one or more stripes of coated material which comprises an adhesive blend including an adhesive and microspheres to provide a friction at the respective web edges and prevent a relative axial movement between adjacent revolutions, and the microspheres have an average diameter greater than a coating thickness of the adhesive such that at least some of the microspheres protrude beyond an exposed surface of the adhesive to contact the adjacent revolution.

12. The method of claim 11, wherein the substrate web is wound in a roll-to-roll process.

13. The method of claim 12, wherein the winding tension is between 0.1 N/cm and 0.5 N/cm.

* * * * *